May 3, 1932. G. A. HAYWARD 1,856,954
VEGETABLE MASHER
Filed Oct. 1, 1929
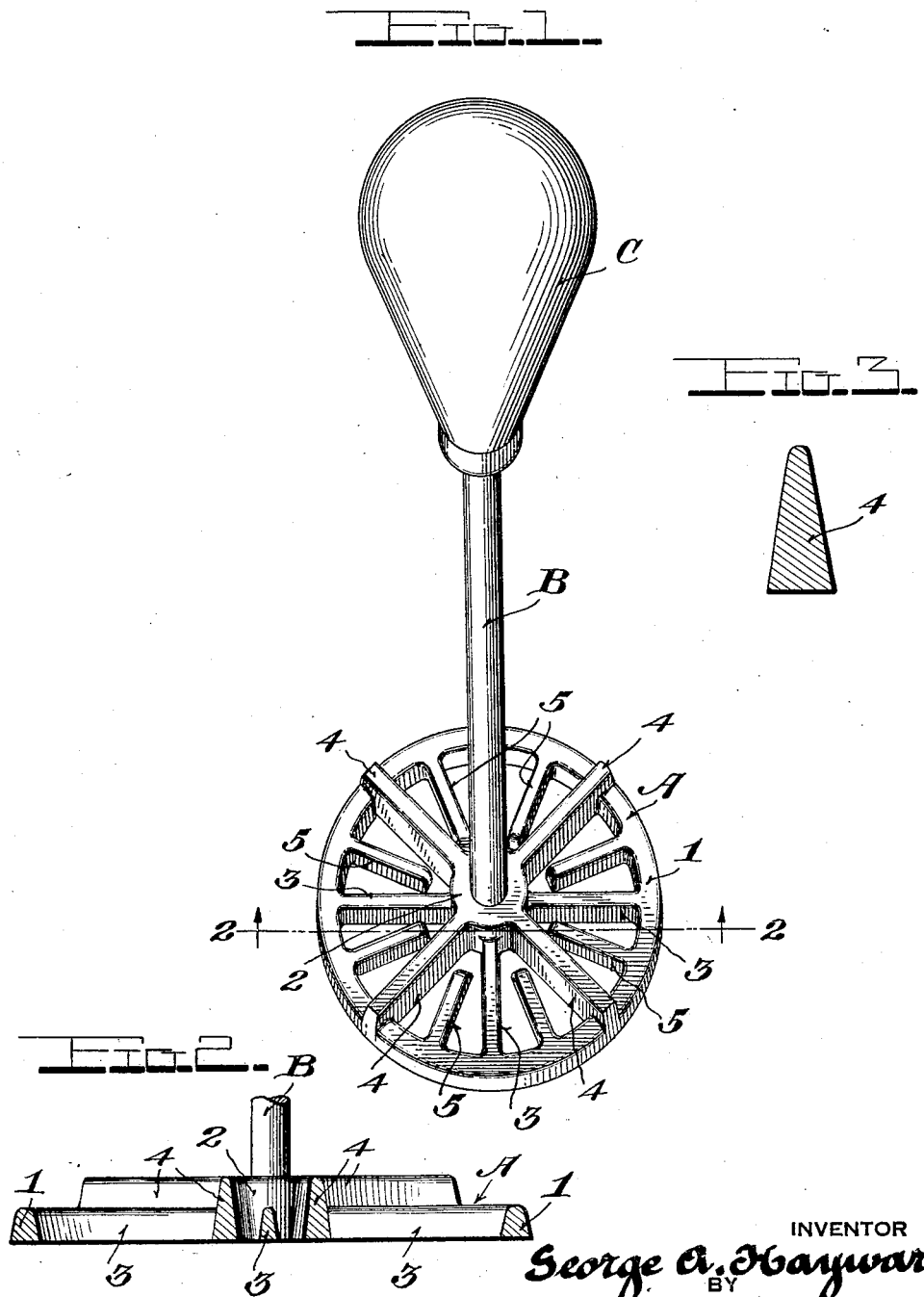
INVENTOR
George A. Hayward
BY
H. G. Manning
ATTORNEY Patented May 3, 1932

1,856,954

UNITED STATES PATENT OFFICE

GEORGE A. HAYWARD, OF WATERTOWN, CONNECTICUT

VEGETABLE MASHER

Application filed October 1, 1929. Serial No. 396,531.

This invention relates to culinary appliances, and more particularly to a vegetable masher.

One of the objects of the invention is to provide a simple and practical device for mashing potatoes, vegetables or the like, and which may be also used for pulverizing sugar, and similar food preparing operations.

A further object of the invention is to provide a construction having paddles or beaters for permitting the use of the device in the whipping of cream, beating of eggs, creaming potatoes, etc., when manipulated with a rotary motion.

With these and other objects in view, there has been illustrated on the accompanying drawings, one form in which the invention may be conveniently embodied in practice.

Fig. 1 is a perspective view of the vegetable masher.

Fig. 2 is a vertical cross-sectional view of the mashing head, taken along a plane passing downwardly through the line 2—2 of Fig. 1.

Fig. 3 is a cross-sectional view taken through one of the raised paddle members.

Referring now to the drawings in which like reference characters designate corresponding parts throughout the several figures of the drawings, the device includes a mashing head designated generally as A, the same being suitably affixed to the shank B of a handle C, whereby the device may be manipulated with a reciprocating movement or plunger action when used for mashing, or may be given a reciprocating and rotary motion when used for beating.

Referring more particularly to the mashing or whipping head A, it will be observed that the same is preferably cast in circular formation and includes a rim portion 1 connected to a hub 2 by a plurality of alternating radially disposed spoke members 3 and paddle members 4, having sector-shaped openings therebetween for permitting the material to be mashed or beaten to pass between the spoke members. A plurality of relatively short inwardly-extending spoke-like members 5 are carried by the inside of the rim 1 and project into the spaces between the spoke members 3 and paddle members 4. These spoke-like members 5, as well as the spoke members 3, preferably lie entirely in the plane of the rim 1, while the paddle members or fins 4 project above the upper surface of said rim to provide an efficient beating action.

The rim 1, the spoke members 3, the paddles 4, and the spoke-like members 5 preferably have sharp lower edges as indicated in Figs. 2 and 3, whereby the material being mashed may be easily cut through. In that connection, it will also be observed from Fig. 2 that the side edges of the rim 1, as well as the radially disposed spoke members 3 and paddles 4, are preferably inclined toward each other in an upward direction or converged, as indicated in Figs. 2 and 3, thereby facilitating the loosening of the material and avoiding clogging of the device during the mashing or beating operations.

The arrangement described provides in effect a self-cleaning or self-clearing mashing head when the device is reciprocated, and the device also acts as an efficient beater for fluid material when a rotary motion is given thereto.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a vegetable masher, a manipulating handle having a mashing and whipping head connected thereto, said head comprising a rim and a hub, a plurality of radially disposed spoke members connecting said rim and hub and lying in the same plane as said rim, a plurality of intervening radially disposed paddle members connecting said rim and hub and extending upwardly out of said plane, and a plurality of mashing elements carried by the rim and projecting inwardly into the space between the said radially disposed spoke and paddle members forming V shaped apertures in said head through which the material may freely pass, said spoke members and mashing elements being wedge shaped in cross section, with their pointed edges upwards.

In testimony whereof, I have affixed my signature to this specification.

GEORGE A. HAYWARD.